United States Patent
Fonden et al.

[15] 3,670,997
[45] June 20, 1972

[54] AIRCRAFT ARRESTING DEVICE

[72] Inventors: Per Borje Fonden, Hejdezatan 3; Karl Ove Torgny Walander, Elsa Brandstrom gata 5, both of Linkoping, Sweden

[22] Filed: Dec. 11, 1969

[21] Appl. No.: 884,157

[30] Foreign Application Priority Data

Dec. 13, 1968 Sweden..................17101/68

[52] U.S. Cl. .......................................244/110 C
[51] Int. Cl. .........................................B64f 1/02
[58] Field of Search............244/110 C, 110 F, 110 G, 110 A, 244/110 R

[56] References Cited

UNITED STATES PATENTS

| | | | |
|---|---|---|---|
| 2,777,653 | 1/1957 | Cotton et al. | 244/110 A |
| 2,846,166 | 8/1958 | Daniels et al. | 244/110 C |
| 2,957,657 | 10/1960 | Frieder et al. | 244/110 C |
| 2,977,075 | 3/1961 | Haber | 244/110 A |
| 3,146,974 | 9/1964 | Petoia | 244/110 C |
| 3,148,849 | 9/1964 | Methven et al. | 244/110 C |
| 3,169,002 | 2/1965 | Fonden et al. | 244/110 A |
| 3,182,935 | 5/1965 | Wischhoefer | 244/110 A |
| 3,484,061 | 12/1969 | Niemkiewicz | 244/110 R |
| 3,353,768 | 11/1967 | Peterson | 244/110 A |

Primary Examiner—Milton Buchler
Assistant Examiner—Paul E. Sauberer
Attorney—Munson & Fiddler

[57] ABSTRACT

An arrangement for arresting landing aircraft in which a cable is usually disposed in the path of the aircraft, the present invention comprising a plurality of parallel cables instead of a single cable, said cables being normally disposed below the surface of the landing field and being capable of being lifted one at a time or lifted together or in other arrangements and numbers, to the raised arresting position.

3 Claims, 8 Drawing Figures

PATENTED JUN 20 1972

INVENTORS
Per Borje Fonden &
Karl Ove Torgny Walande
BY
Munson + Fiddler
Attorneys

AIRCRAFT ARRESTING DEVICE

The present invention relates to an apparatus for arresting aircraft and which consists of an arrestor device arranged across a runway, the ends of the device being connected to one or more braking devices.

A problem common to all types of arresting apparatus is to limit the loads to a reasonable level. This applies particularly to loads arising in the aircraft structure for example, in the arrestor hook that is installed for the purpose in many aircraft.

In recent years the problem has been accentuated by aircraft of widely differing weights operating from the same airfield. The arrestor device must be designed for the heaviest planes, with the result that the loads become troublesome for lighter aircraft. Special limitations can also arise due to hooks having been installed on existing aircraft after their manufacture, where it has been necessary to restrict the maximum permissible hook load to avoid extensive modifications to the airframe.

The problem affects the design of the brake unit used to absorb the kinetic energy of the aircraft. The weight of the cable stretched across the runway contributes considerably to the load peak when the cable is suddenly accelerated to the speed of the moving aircraft.

The problems above mentioned are solved with the present invention, the main feature of which is that the arrestor device consists of two or more parallel cables or the like, the same being either similar or dissimilar and being capable of being selected and raised to the operative position one at a time, or similar or dissimilar, capable of being selected in the required numbers and raised to the operating position. The lifting of a single cable from a trench is known, such an arrangement being shown for example in U.S. Pat. Nos. 3,138,355 and 3,167,277, but no selective choice of parallel cables is disclosed in these patents.

Reference is to be had to the accompanying drawings in which.

Figure 3:
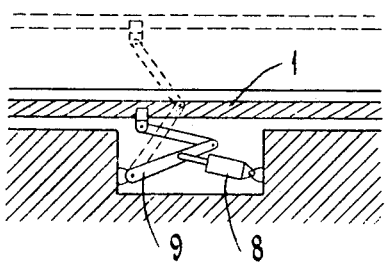
Figure 4:
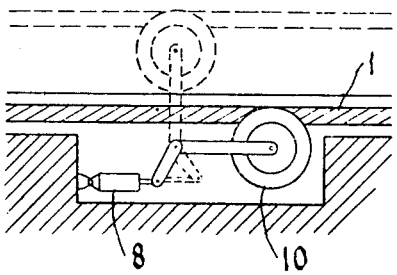
Figure 5:
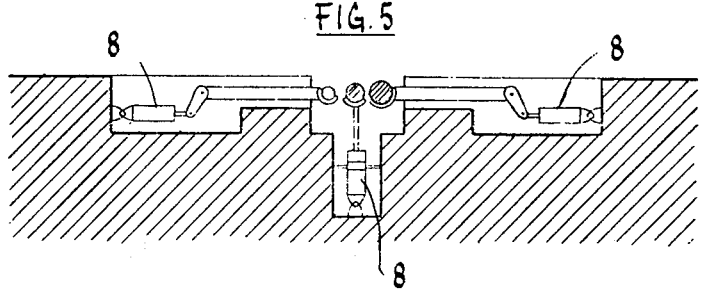
Figure 6:
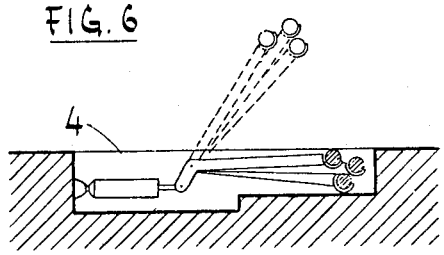
Figure 7:
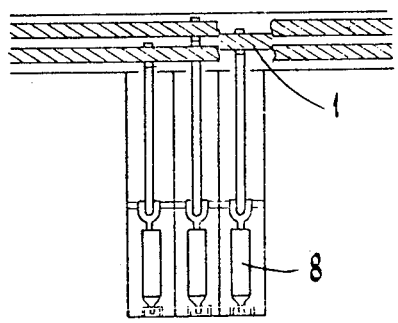

FIGS. 3 and 4 respectively show different examples of mechanisms for raising the cables;

FIGS. 5, 6 and 7 show several cables laid in the same trench and

Figure 8:
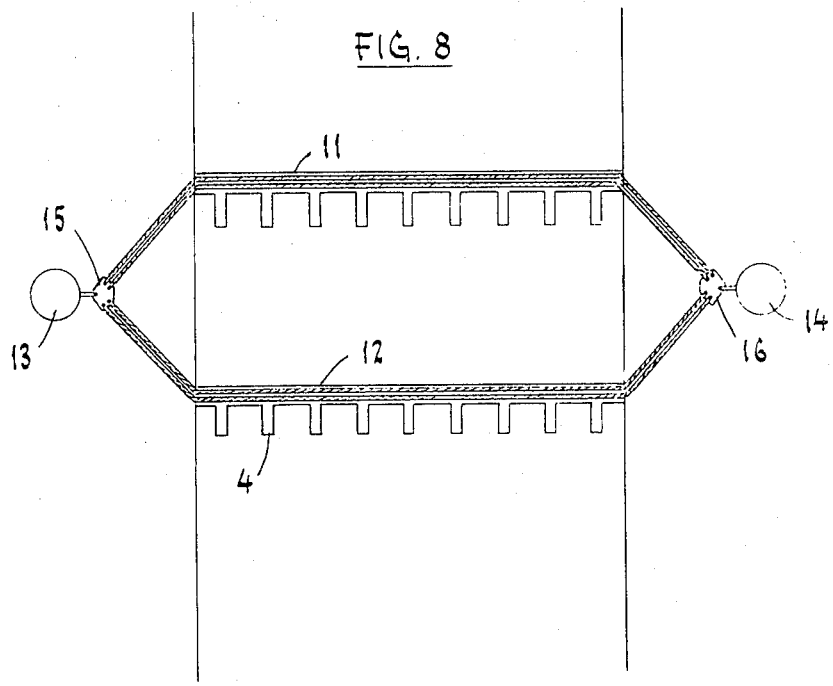

FIG. 8 shows several groups of arrestor cables in spaced relation or laid at a distance from one another.

Figure 1:
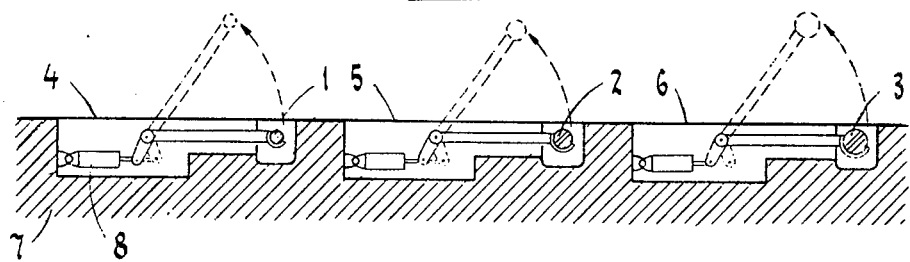
FIG. 1 shows a section through a runway with an arrestor arrangement consisting of three parallel cables, each of the same being arranged in its own trench.
Figure 2:
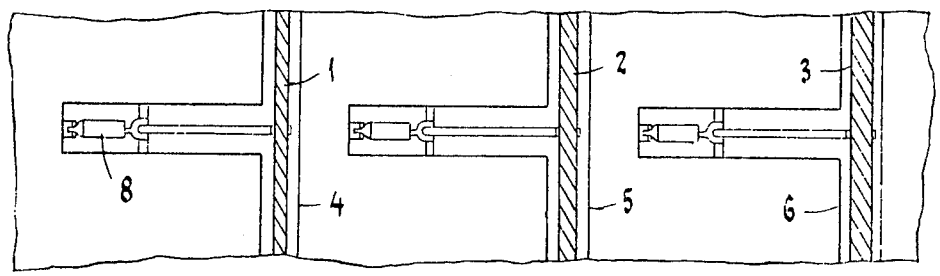
FIG. 2 is a plan view of the structure of FIG. 1.

FIG. 1 of the drawings shows three different cables of different thicknesses, the cables being indicated at 1, 2 and 3, and which, in their lowered position, rest in trenches 4, 5 and 6 respectively, or in recesses in the runway 7. Spaced apart at uniform distances in the trenches are hydraulic or pneumatic lifting devices 8 with levers attached, by means of which any cable or cables can be lifted to the raised position shown in dotted lines, while the other cables remain lowered or in their respective trenches, thus avoiding arresting the aircraft unintentionally. The cables are fixed at their ends to brakes, not shown.

FIG. 3 shows a scissors-link mechanism 9 between the lifting device 8 and the cable 1, for raising the cable to the elevated position shown in dotted lines.

FIG. 4 shows the cable carried on a roller 10 that is supported by the lifting mechanism. This arrangement allows the cable to move longitudinally in relation to the mechanism during raising.

FIG. 5 shows the cables all located in the same trench. This makes the installation simpler to build and simpler to maintain, from the point of view of cleaning, snow-clearing and the like. The lifting mechanism can be suitably arranged as shown in the drawing, with the cable in the middle being lifted vertically upwardly.

Instead of the cables being of different thicknesses, they can all be of the same thickness and can be selected and lifted one at a time or, for similar or dissimilar cables, selected and lifted in various different combinations.

FIGS. 6 and 7 show three cables of different thicknesses, and which can be lifted singly or in combination, that is, all together as shown in FIG. 6.

FIG. 8 shows two trenches 11 and 12, with two cables in each trench. The trenches are located at such a distance from each other that the second set of arrestor cables (in the direction of travel of the aircraft) can act as a reserve for the first, if the first cable should be missed by the hook of the aircraft for any reason. The arrangement can also comprise more than two trenches, each having a plurality of the cables, without departing from the spirit of this invention.

The cables shown in FIG. 8 are connected at each end to brakes 13 and 14 by means of the yokes 15 and 16.

A multi-cable system can be complemented by some known type of automatic or remotely-operated coupling, to connect the brake unit to the cable or cables by which the aircraft is arrested or is to be arrested, and to disconnect idle cables.

The system operates satisfactorily even without such a coupling. All cables can therefore be permanently connected to the brake unit, either individually or in groups. This is because the cables are not immediately accelerated, but rather successively, beginning at the point of connection with the active cable or cables, which means that the extra loading due to them is small. If such couplings are not provided, or in fact even when they are provided for safety reasons, the trench and the means of locating the cables in the trench must be so constructed that the cables can be pulled up out of the trench. Pulling out will begin at the ends, as described above, and travel inwardly toward the center.

Instead of cables, some other equivalent elements, such a bands can be employed. Thus, while the term "cables" is used herein it will be understood that the same means any equivalent elements as above stated.

What is claimed is:

1. A device for arresting air craft traversing a runway surface, comprising a plurality of separate arresting cables extending transversely to the runway said cables having different tensile strength and being interconnected at their ends, at least one end being connected to a braking device, means for raising said cables above the runway into an aircraft arresting position, said means having means to raise said cables as a bundle or individually for engagement with the aircraft, the cables being selected according to the anticipated load to be exerted thereon and to absorb the initial impact force of aircraft of different weight.

2. An arrangement according to claim 1, wherein the cables, when in an inactive or rest position, lie below the surface of a runway and in the same trench.

3. An arrangement according to claim 1, wherein the cables are provided with automatic or remotely-controlled couplings of a known type to apply or bring about a power-transmitting connection between the brake device and that cable or cables by which the aircraft is arrested or intended to be arrested.

* * * * *